(12) United States Patent
Yao

(10) Patent No.: US 8,514,176 B2
(45) Date of Patent: Aug. 20, 2013

(54) INPUT SYSTEM COMBINING A MOUSE AND A PLANAR SENSING DEVICE

(75) Inventor: Jung-Yin Yao, Taoyuan (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 239 days.

(21) Appl. No.: 13/154,430

(22) Filed: Jun. 6, 2011

(65) Prior Publication Data
US 2011/0304545 A1  Dec. 15, 2011

(30) Foreign Application Priority Data
Jun. 9, 2010  (TW) .............................. 99211009 U

(51) Int. Cl.
*G09G 5/08* (2006.01)
*G06F 3/041* (2006.01)

(52) U.S. Cl.
USPC .......................................... 345/163; 345/173

(58) Field of Classification Search
USPC ................................................. 345/163, 173
See application file for complete search history.

(56) References Cited

U.S. PATENT DOCUMENTS

| | | | | |
|---|---|---|---|---|
| 5,831,597 A | * | 11/1998 | West et al. | 345/163 |
| 2005/0184973 A1 | * | 8/2005 | Lum et al. | 345/173 |
| 2005/0200611 A1 | * | 9/2005 | Goto et al. | 345/173 |
| 2008/0158166 A1 | * | 7/2008 | James et al. | 345/173 |
| 2008/0204421 A1 | * | 8/2008 | Hsu | 345/173 |
| 2009/0102774 A1 | * | 4/2009 | Hattori | 345/92 |
| 2010/0274906 A1 | * | 10/2010 | Fuks et al. | 709/227 |
| 2011/0007078 A1 | * | 1/2011 | Cao et al. | 345/473 |

* cited by examiner

*Primary Examiner* — Chanh Nguyen
*Assistant Examiner* — James Nokham
(74) *Attorney, Agent, or Firm* — Winston Hsu; Scott Margo

(57) ABSTRACT

A planar sensing device is coupled to a host and connected to a mouse. When at least one object triggers the planar sensing device, the planar sensing device determines motion of the object according to variation of a sound, a temperature, an electric field, a pressure, a light path, and/or an image caused by the object triggering the planar sensing device. A calculation device generates a corresponding instruction according to the motion of the object.

9 Claims, 14 Drawing Sheets

INPUT SYSTEM COMBINING A MOUSE AND A PLANAR SENSING DEVICE

BACKGROUND OF THE INVENTION

1. Field of the Invention

The present invention is related to an input system, and particularly to an input system that combines a mouse and a planar sensing device.

2. Description of the Prior Art

A touch function allows a user to utilize at least one finger or object to touch any icon of a touch panel for performing a corresponding function. Large industrial equipment, household appliances, and medical equipment have all used the touch function in the past. However, the touch function is also generally found today in consumer electronic products, such as mobile phones, tablet computers and electronic books.

The touch function in the consumer electronic products can take the place of buttons or a mouse to perform functions (such as hot keys) that cannot be performed rapidly using the buttons or the mouse, which results in the consumer electronic products with the touch function being cool, convenient, and fashionable. In a product without the touch function, the user can only rely on a keyboard or a mouse to input commands, unless the user replaces the product without the touch function with a product with the touch function. Therefore, the prior art does not provide a function similar to the touch panel when the user uses a product without the touch function.

SUMMARY OF THE INVENTION

An embodiment provides an input system combining a mouse and a planar sensing device. The input system includes a mouse, a planar sensing device, and a calculation device. The mouse is coupled to a host. The planar sensing device is coupled to the host and connected to the mouse for determining motion of at least one object according to variations of a sound, a temperature, an electric field, a pressure, a light path, and/or an image caused by the at least one object when the at least one object touches the planar sensing device. The calculation device is used for generating at least one corresponding instruction according to the motion of the at least one object.

The present invention provides an input system combining a mouse and a planar sensing device. The input system allows a user to rapidly perform functions shown in FIG. 2 to FIG. 14 when the user uses a product without a touch function. Therefore, similar to a touch panel, the present invention can perform at least one hot key function without using a mouse or a button.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
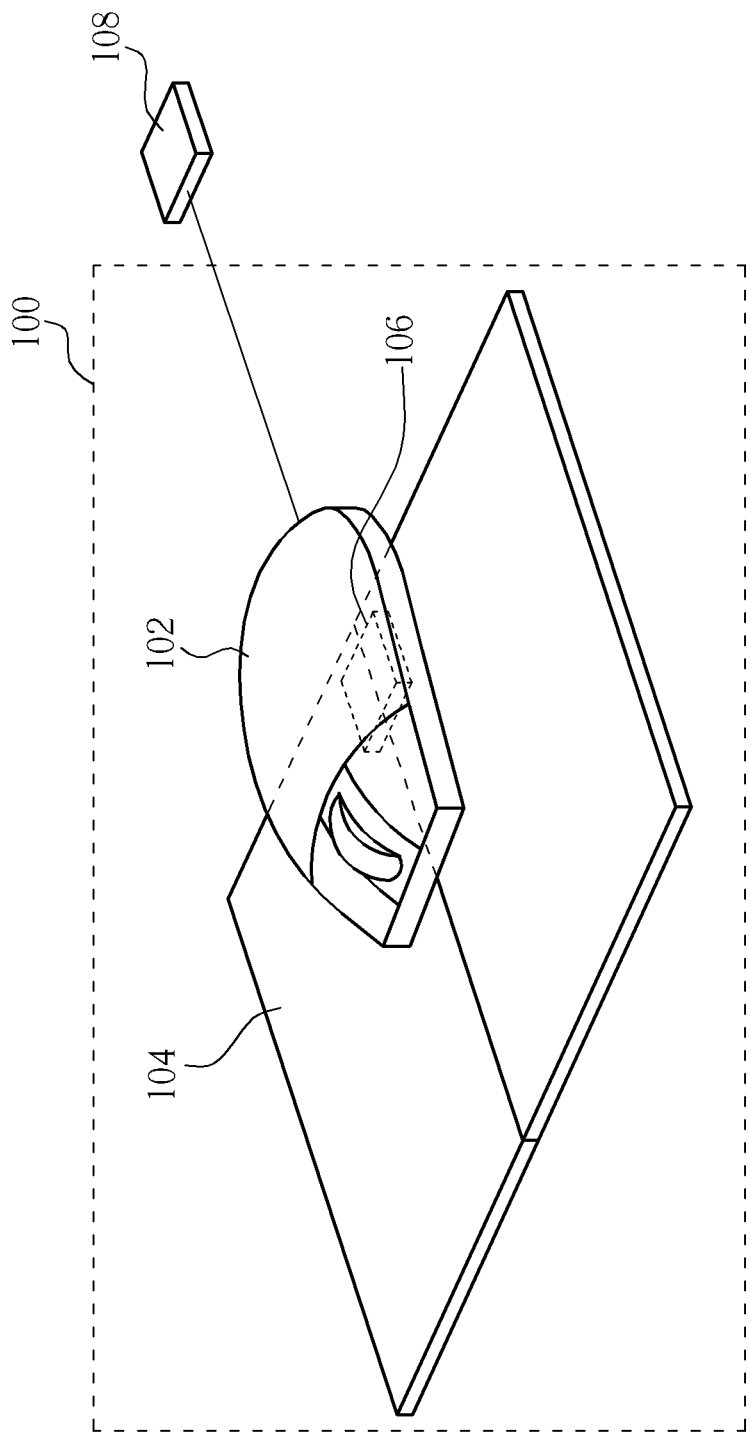
FIG. 1 is a diagram illustrating an input system 100 combining a mouse and a planar sensing device according to an embodiment.

Please refer to FIG. 1. FIG. 1 is a diagram illustrating an input system 100 combining a mouse and a planar sensing device according to an embodiment. The input system 100 includes a mouse 102, a planar sensing device 104, and a calculation device 106. The mouse 102 is coupled to a host 108. The planar sensing device 104 is coupled to the host 108 and connected to the mouse 102 for determining motion of at least one object according to variations of a sound, a temperature, an electric field, a pressure, a light path, and/or an image caused by the at least one object when the at least one object touches the planar sensing device 104. The planar sensing device 104 is a resistive touch device, a capacitive touch device, a sound detection device, a temperature detection device, a pressure detection device, an infrared ray detection device, an image capture device, or a combination thereof. The calculation device 106 is used for generating at least one corresponding instruction according to the motion of the at least one object.

The present invention uses fingers of a user as objects for illustration. At the beginning, the input system 100 is connected to the host 108. When at least one finger of the user touches a left half area of the planar sensing device 104 over a first predetermined time T1, the left half area of the planar sensing device 104 is enabled and a right half area of the planar sensing device 104 and the mouse 102 are disabled synchronously. When the at least one finger of the user touches the right half area of the planar sensing device 104 over the first predetermined time T1, the right half area of the planar sensing device 104 is enabled and the left half area of the planar sensing device 104 and the mouse 102 are disabled synchronously. That is to say, after the planar sensing device 104 determines an area touched by the at least one finger of the user, the planar sensing device 104 reduces sensing range to the left half area or the right half area of the planar sensing device 104 according to the area touched by the at least one finger of the user. In addition, when the at least one finger of the user does not touch the planar sensing device 104 over a second predetermined time T2, the planar sensing device 104 is disabled and the mouse 102 is enabled synchronously.

After the sensing range of the planar sensing device 104 is determined, the user can utilize the planar sensing device 104 to perform a function similar to a touch panel. FIG. 2 to FIG. 14 are diagrams illustrating the user utilizing the at least one finger to touch the planar sensing device 104 for the planar sensing device 104 to perform the function similar to the touch panel. In FIG. 2 to FIG. 14, the sensing range of the planar sensing device 104 is the left half area of the planar sensing device 104, and the user utilizes at least one finger of a right hand to touch the planar sensing device 104. But, the present invention is not limited to the left half area of the planar sensing device 104 and the user utilizing the at least one finger of the right hand.

Figure 2:
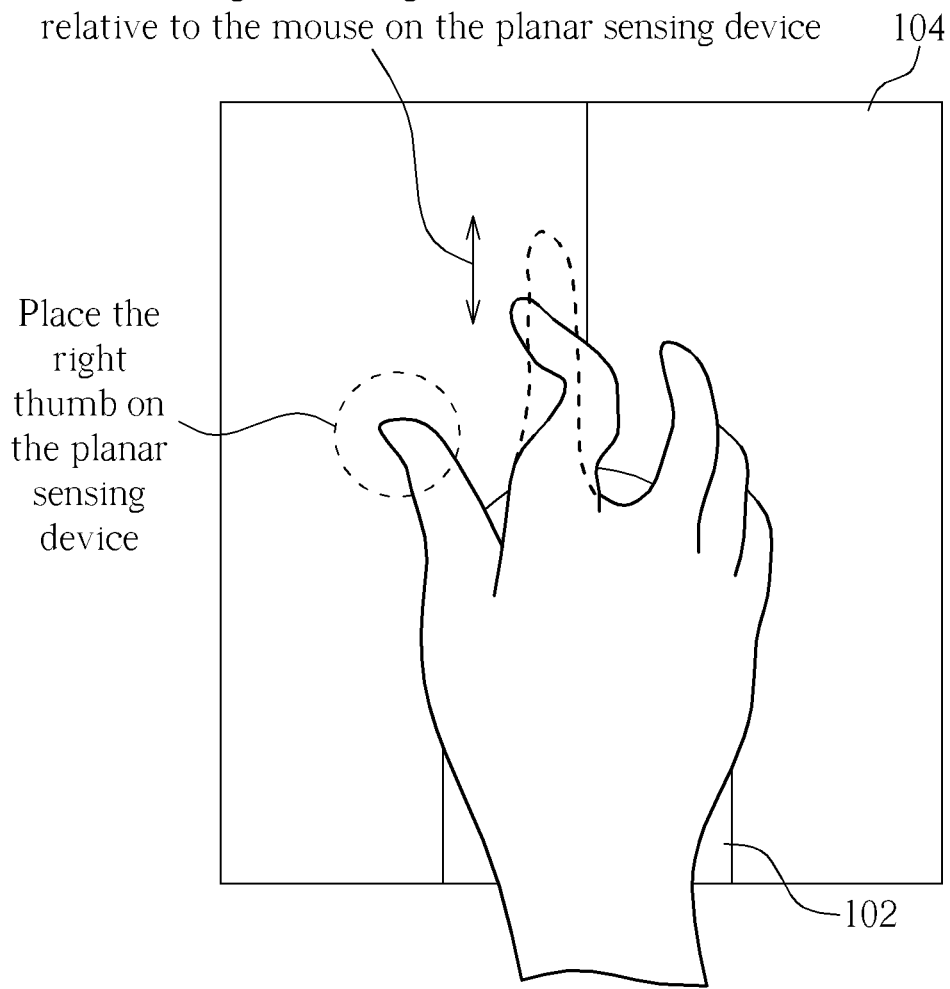
FIG. 2 to FIG. 14 are diagrams illustrating the user utilizing the at least one finger to touch the planar sensing device for the planar sensing device to perform the function similar to the touch panel.

As shown in FIG. 2, when a right thumb of the user is placed on the planar sensing device 104 and a right forefinger of the user is moved forward and backward relative to the mouse 102 on the planar sensing device 104, the planar sensing device 104 determines that a finger of the user is placed on the planar sensing device 104 and another finger of the user is moved forward and backward relative to the mouse 102 according to variations of a sound, a temperature, an electric field, a pressure, a light path, and/or an image caused by the right thumb and the right forefinger of the user on the planar sensing device 104. Then, the calculation device 106 generates a vertical page scroll command and transmits the vertical page scroll command to the host 108 according to a determination result of the planar sensing device 104, and the host 108 vertically scrolls a page presently displayed on a screen of the host 108 according to the vertical scroll page command.

Further, subsequent operational principles of the planar sensing device 104, the calculation device 106, and the host 108 in FIG. 3 to FIG. 14 are the same as those of the planar sensing device 104, the calculation device 106, and the host 108 in FIG. 2, so further descriptions thereof are omitted for simplicity.

Figure 3:
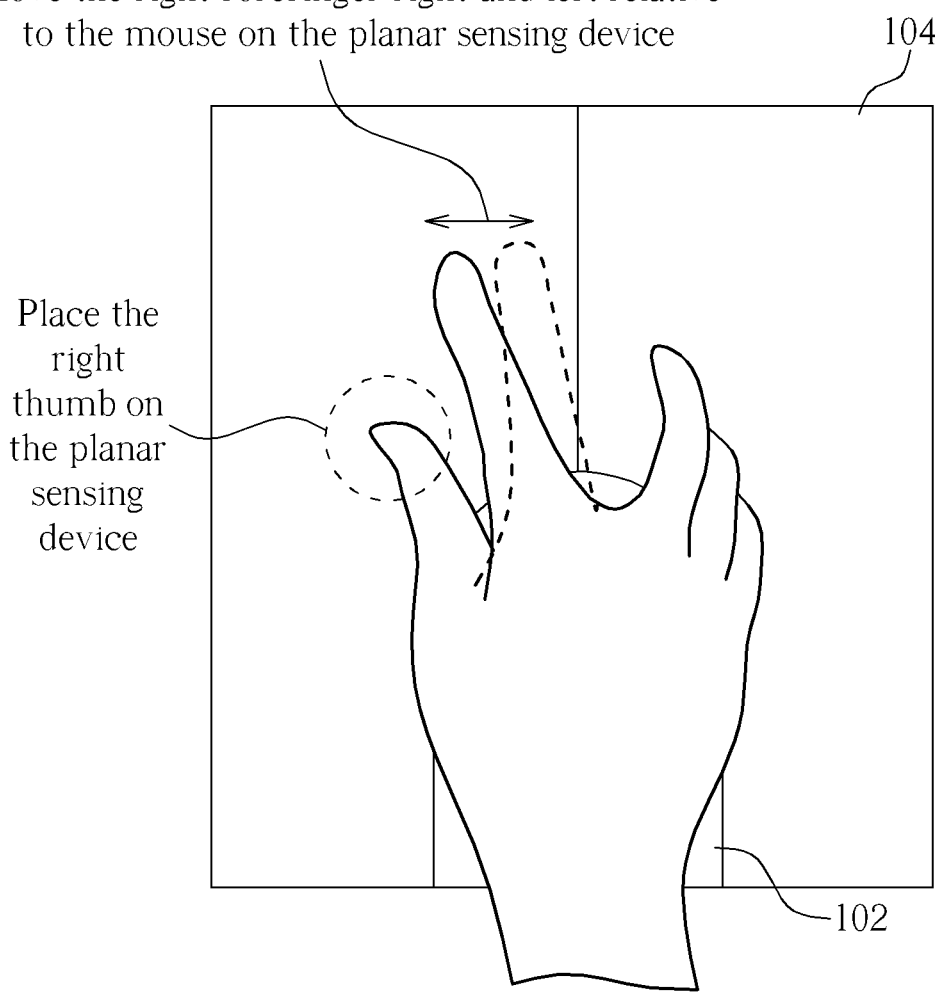

As shown in FIG. 3, when the right thumb of the user is placed on the planar sensing device 104 and the right forefinger of the user is moved right and left relative to the mouse 102 on the planar sensing device 104, the host 108 horizontally scrolls a page presently displayed on the screen of the host 108.

Figure 4:
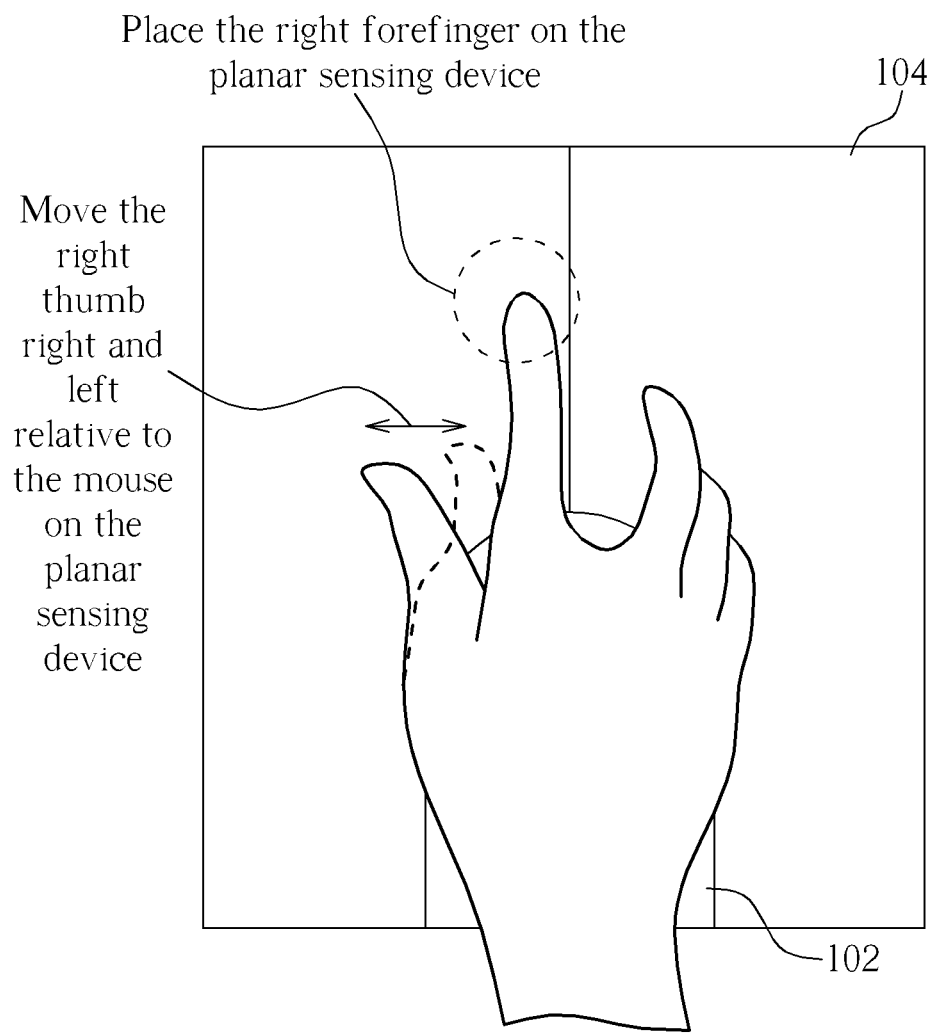

As shown in FIG. 4, when the right forefinger of the user is placed on the planar sensing device 104 and the right thumb of the user is moved right and left relative to the mouse 102 on the planar sensing device 104, the host 108 switches a page presently displayed on the screen of the host 108 to a last page or a next page.

Figure 5:
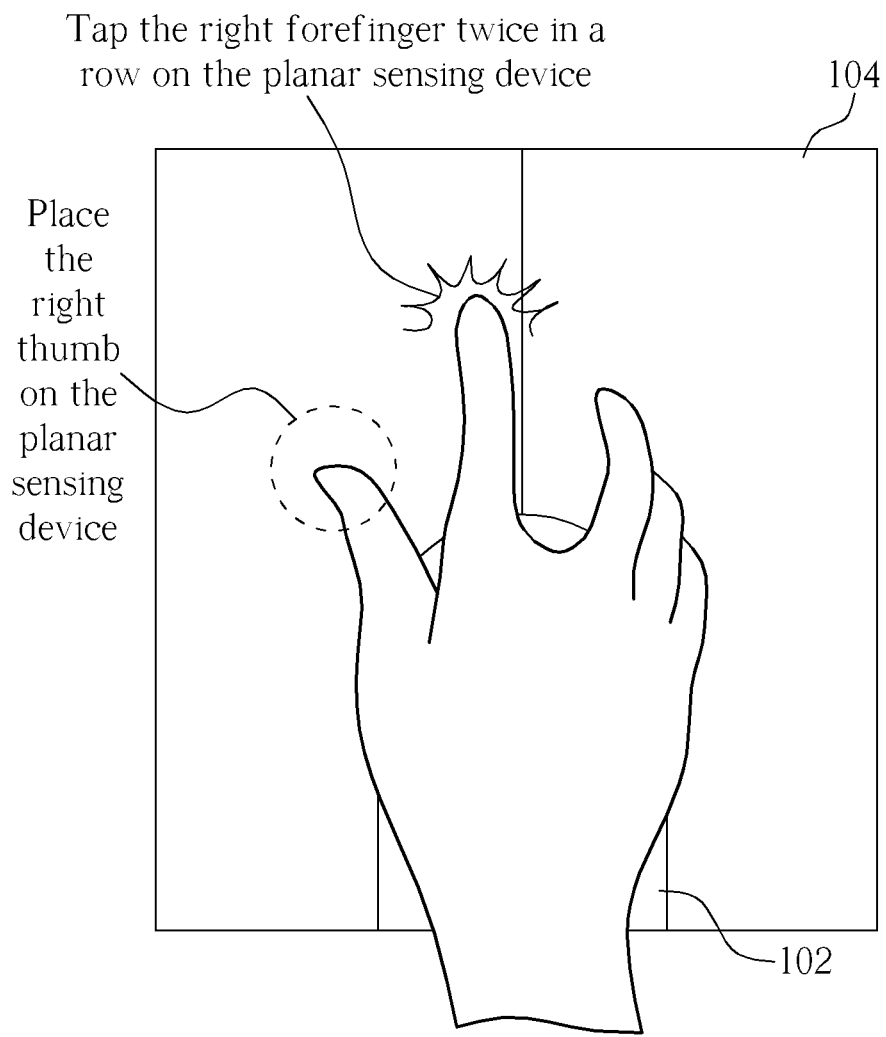

As shown in FIG. 5, when the right thumb of the user is placed on the planar sensing device 104 and the right forefinger of the user are tapped twice in a row on the planar sensing device 104, the host 108 stores a page presently displayed on the screen of the host 108.

Figure 6:
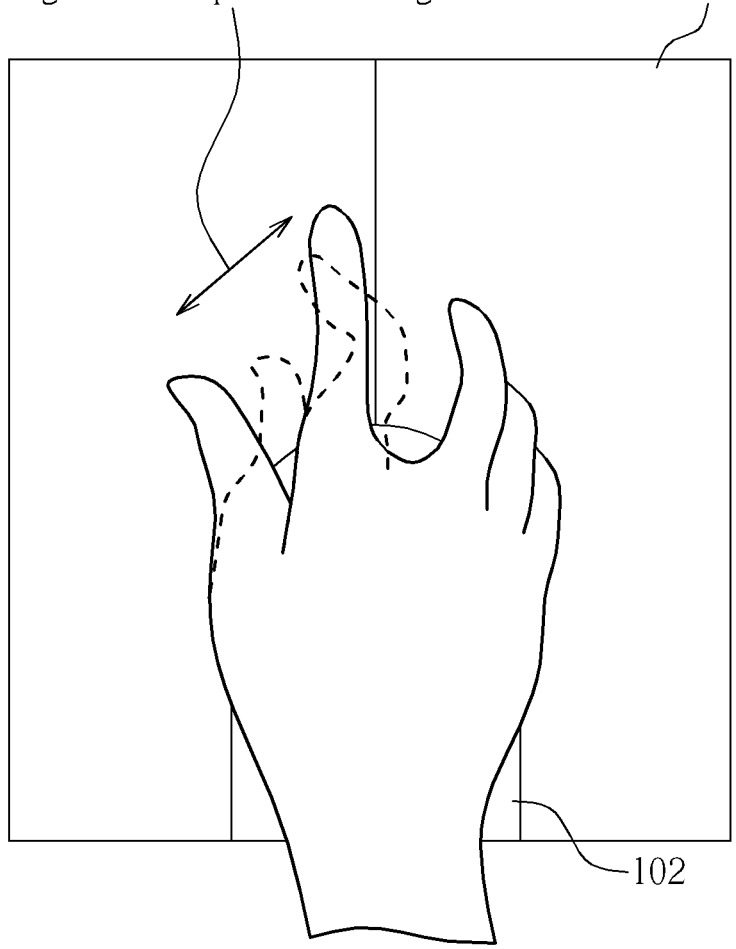

As shown in FIG. 6, when the right thumb and the right forefinger of the user are moved away from each other simultaneously on the planar sensing device 104, the host 108 zooms in a page presently displayed on the screen of the host 108. When the right thumb and the right forefinger of the user are pinched on the planar sensing device 104, the host 108 zooms out the page presently displayed on the screen of the host 108.

Figure 7:
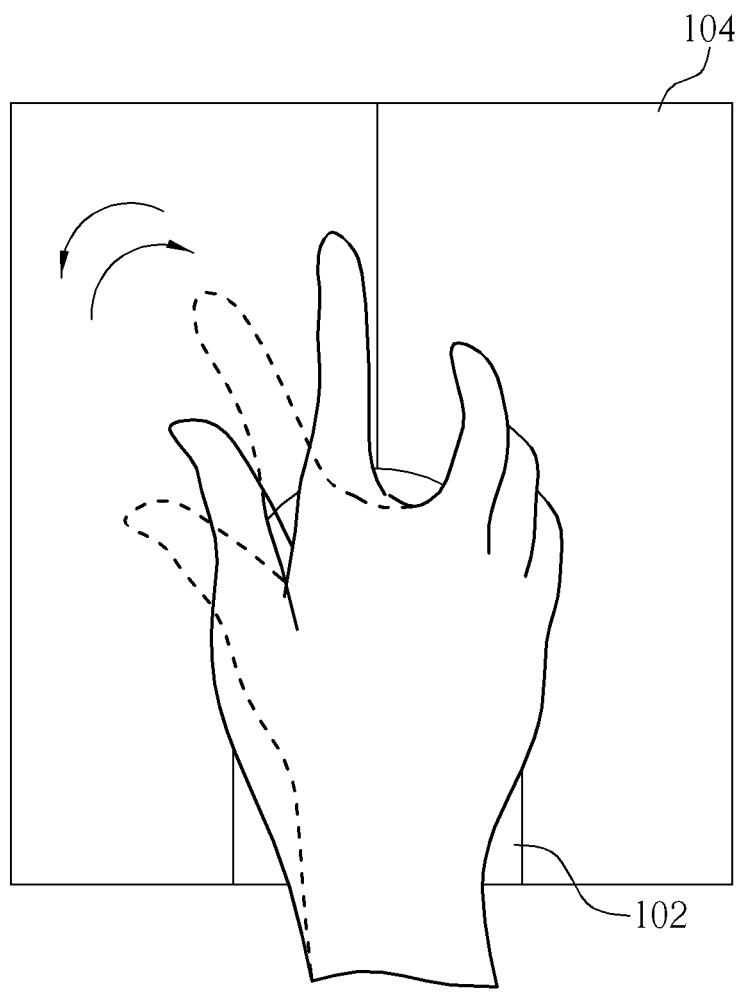

As shown in FIG. 7, when the right thumb and the right forefinger of the user are rotated clockwise simultaneously on the planar sensing device 104, the host 108 rotates a page presently displayed on the screen of the host 108 clockwise. When the right thumb and the right forefinger of the user are rotated counterclockwise simultaneously on the planar sensing device 104, the host 108 rotates the page presently displayed on the screen of the host 108 counterclockwise.

Figure 8:
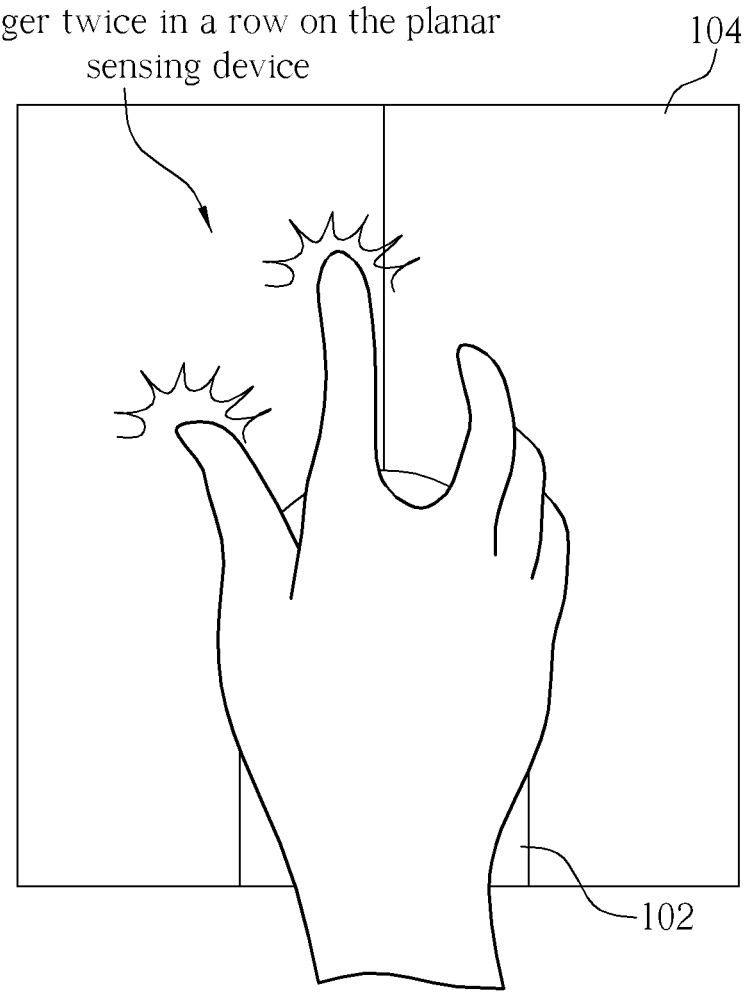

As shown in FIG. 8, when the right thumb and the right forefinger of the user are tapped twice in a row on the planar sensing device 104, the host 108 saves a program execution page presently displayed on the screen of the host 108. If the host 108 has a lens, the lens can act as a shutter for the user to capture an image thereof when the right thumb and the right forefinger of the user are tapped twice in a row on the planar sensing device 104.

Figure 9:
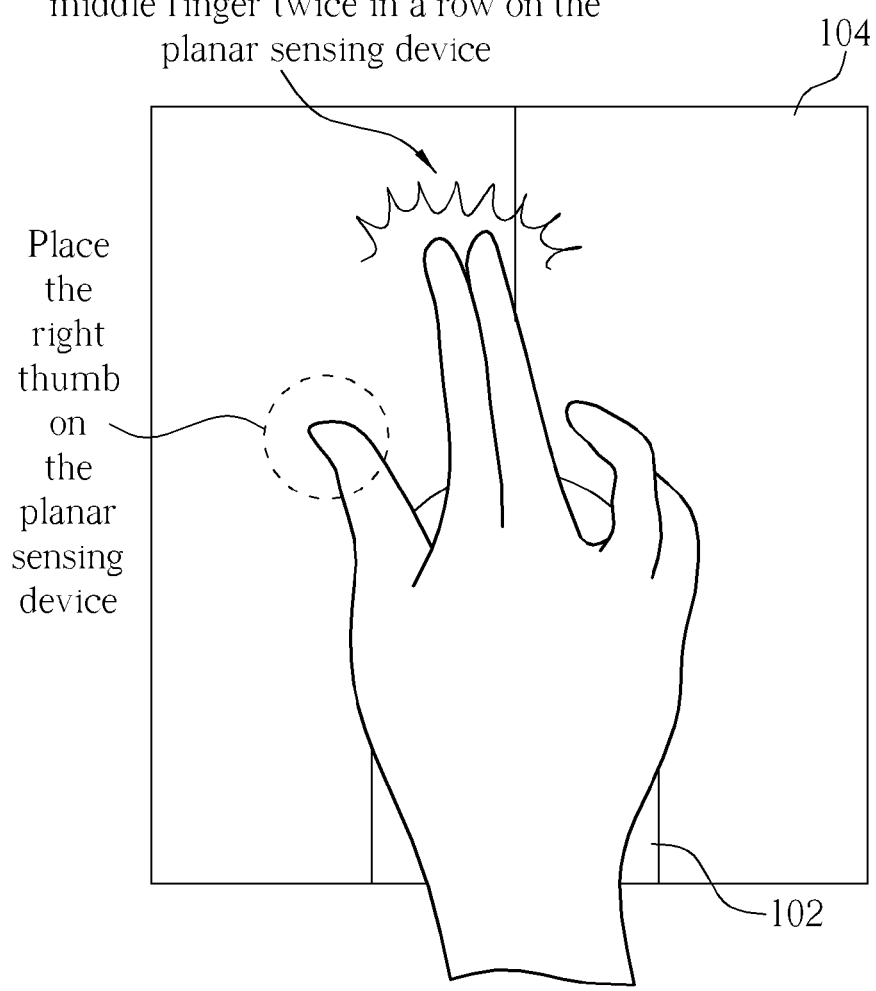

As shown in FIG. 9, when the right thumb of the user is placed on the planar sensing device 104 and the right forefinger and a right middle finger of the user are tapped twice in a row on the planar sensing device 104, the host 108 turns on or turns off a multimedia player (such as an MP3 player, or a DVD player) built into the host 108.

Figure 10:
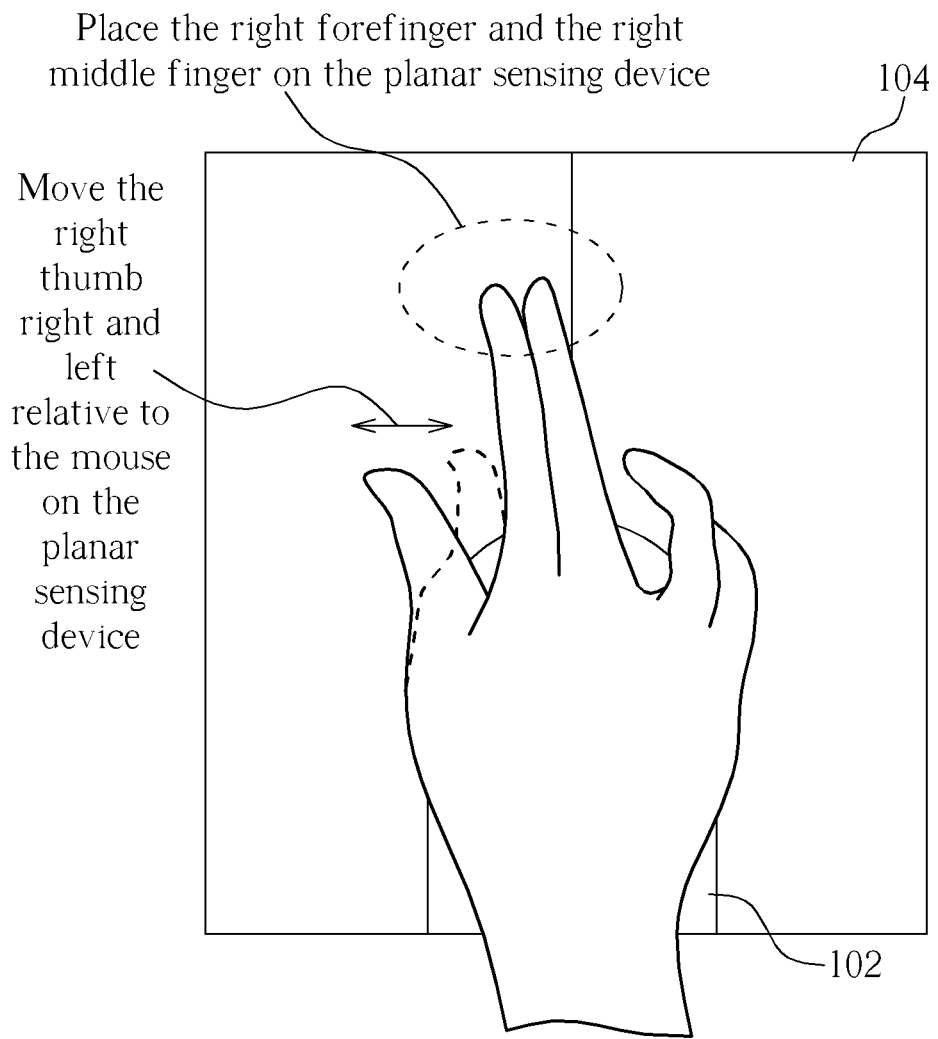

As shown in FIG. 10, when the right forefinger and the right middle finger of the user are placed on the planar sensing device 104 and the right thumb of the user is moved right and left relative to the mouse 102 on the planar sensing device 104, the host 108 plays or stops playing a multimedia file (such as an MP3 file, or a DVD file) on the multimedia player.

Figure 11:
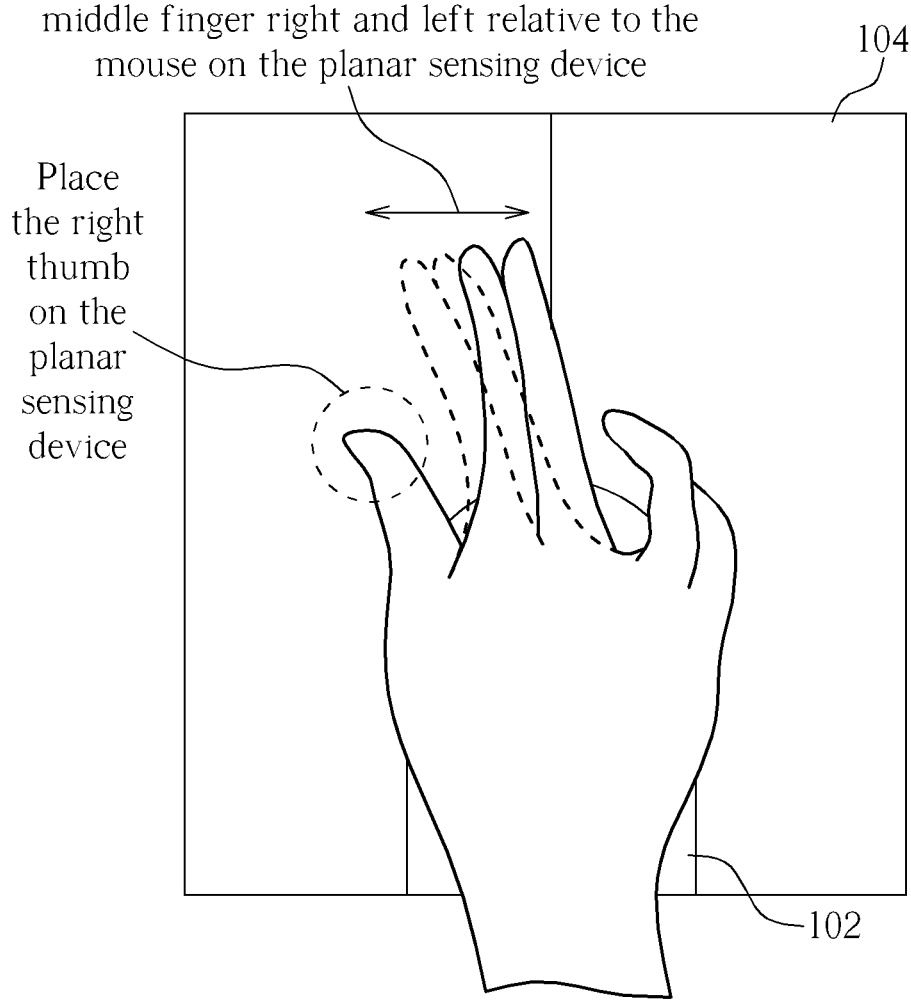

As shown in FIG. 11, when the right thumb of the user is placed on the planar sensing device 104, and the right forefinger and the right middle finger of the user are moved right and left relative to the mouse 102 on the planar sensing device 104, the host 108 switches a multimedia file presently played by the multimedia player to a last file or a next file.

Figure 12:
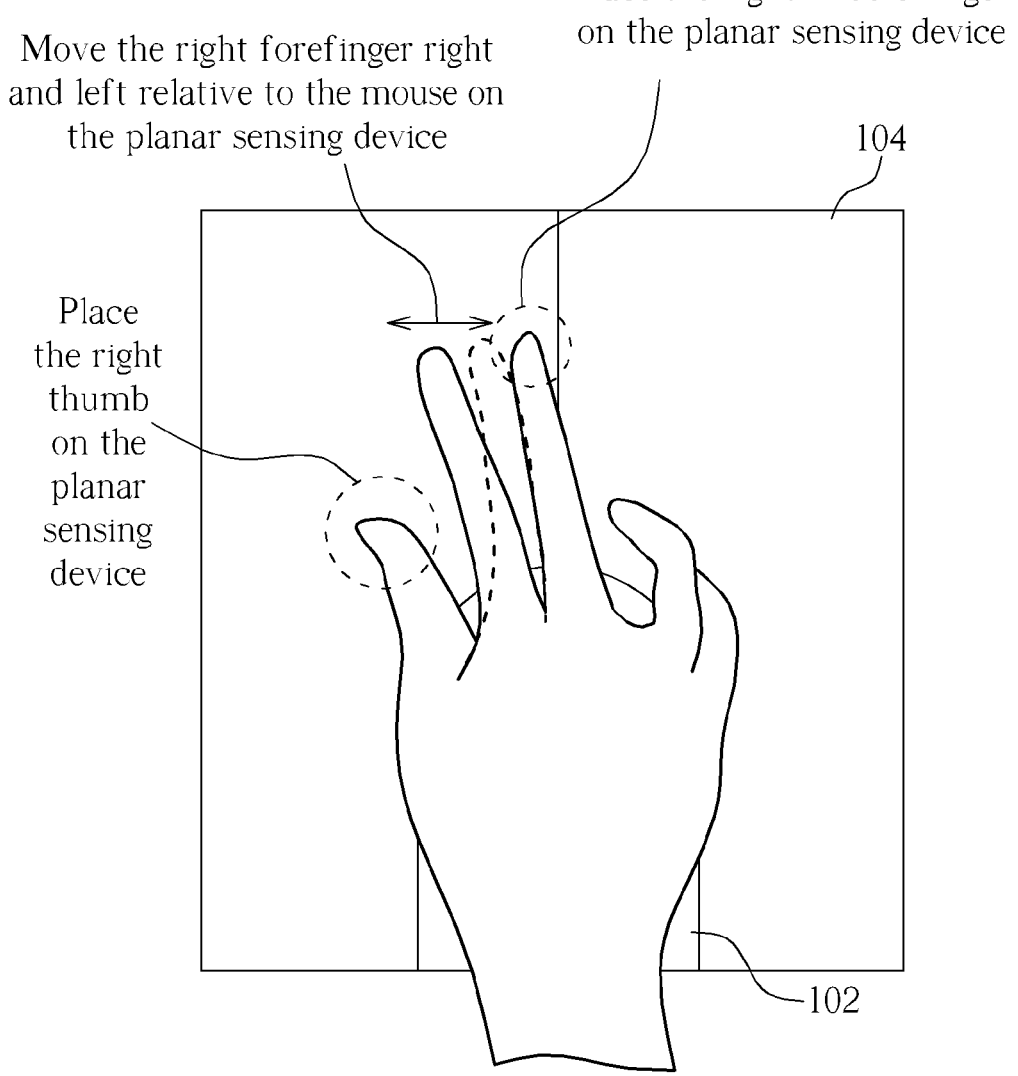

As shown in FIG. 12, when the right thumb and the right middle finger of the user are placed on the planar sensing device 104 and the right forefinger of the user is moved right and left relative to the mouse 102 on the planar sensing device 104, the host 108 raises or lowers volume of a multimedia file presently played by the multimedia player.

Figure 13:
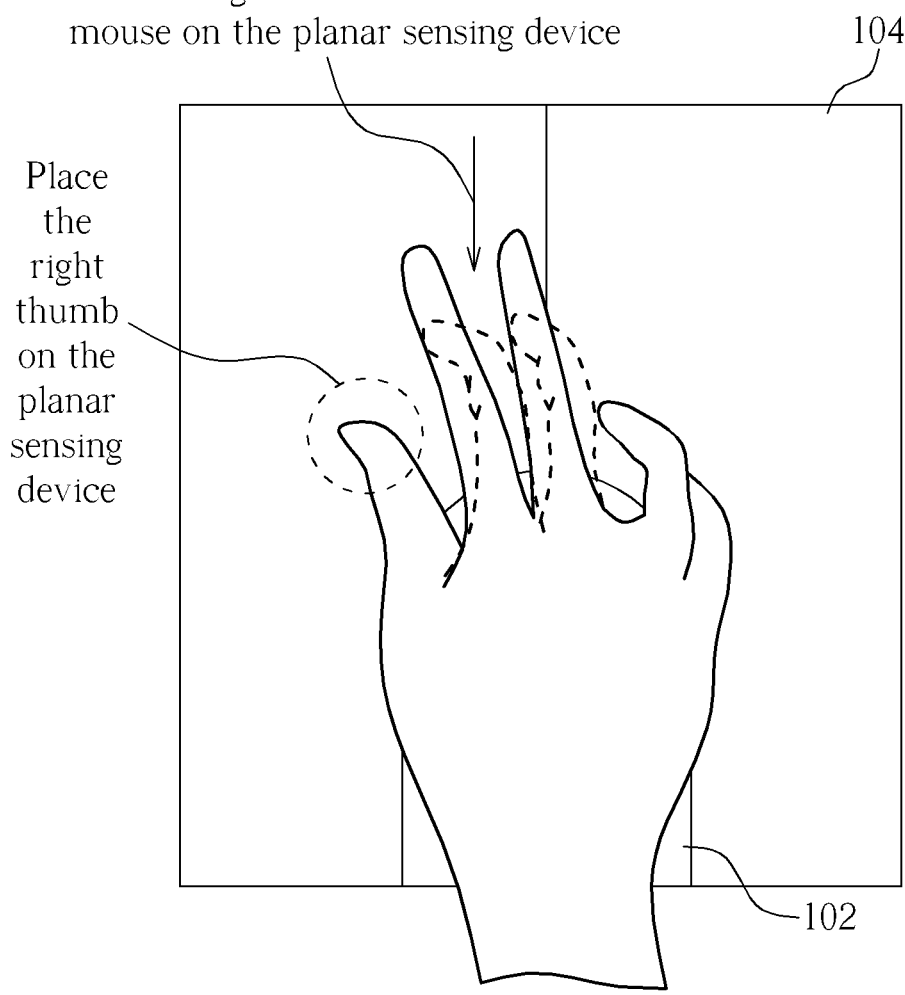

As shown in FIG. 13, when the right thumb of the user is placed on the planar sensing device 104 and the right forefinger and the right middle finger of the user are moved inward relative to the mouse 102 on the planar sensing device 104, the host 108 mutes volume of a multimedia file presently played by the multimedia player.

Figure 14:
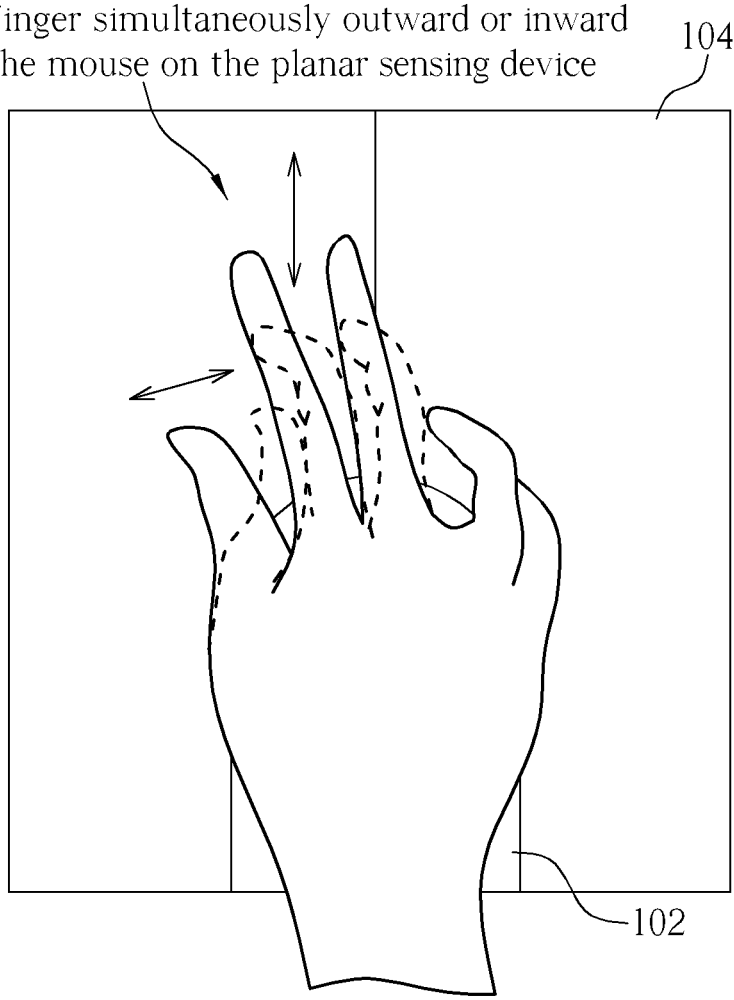

As shown in FIG. 14, when the right thumb, the right forefinger and the right middle finger of the user are simultaneously moved outward or inward relative to the mouse 102 on the planar sensing device 104, the host 108 minimizes or maximizes a multimedia player presently running on the screen of the host 108.

The present invention is not limited to the relationships between gestures of the user and corresponding commands of the host 108 shown in FIG. 2 to FIG. 14. Any input system combining a mouse and a planar sensing device that utilizes gestures of a user to perform a function similar to a touch panel falls within the scope of the present invention.

To sum up, the input system combining the mouse and the planar sensing device allows the user to rapidly perform functions shown in FIG. 2 to FIG. 14 when the user uses a product without a touch function. Therefore, similar to a touch panel, the present invention can perform hot key functions without using a mouse or buttons.

Those skilled in the art will readily observe that numerous modifications and alterations of the device and method may be made while retaining the teachings of the invention.

What is claimed is:

1. An input system combining a mouse and a planar sensing device, the input system comprising:
    a mouse coupled to a host;
    a planar sensing device coupled to the host and connected to the mouse for determining motion of at least one object according to variations of a sound, a temperature, an electric field, a pressure, a light path, and/or an image caused by the at least one object when the at least one object touches the planar sensing device; and
    a calculation device for generating at least one corresponding instruction according to the motion of the at least one object;
    wherein the planar sensing device is enabled and the mouse is disabled synchronously when the at least one object touches the planar sensing device over a first predetermined time; and the planar sensing device is disabled and the mouse is enabled synchronously when the at least one object does not touch the planar sensing device over a second predetermined time;
    wherein a left half area of the planar sensing device is enabled and a right half area of the planar sensing device and the mouse are disabled synchronously when the at least one object touches the left half area of the planar sensing device over the first predetermined time.

2. The input system of claim 1, wherein a right half area of the planar sensing device is enabled and a left half area of the planar sensing device and the mouse are disabled synchronously when the at least one object touches the right half area of the planar sensing device over the first predetermined time.

3. The input system of claim 1, wherein the planar sensing device is a resistive touch device for determining the motion of the at least one object according to the variation of the electric field caused by the at least one object when the at least one object touches the planar sensing device.

4. The input system of claim 1, wherein the planar sensing device is a capacitive touch device for determining the motion of the at least one object according to the variation of the electric field caused by the at least one object when the at least one object touches the planar sensing device.

5. The input system of claim 1, wherein the planar sensing device is a sound detection device for determining the motion of the at least one object according to the variation of the sound caused by the at least one object when the at least one object touches the planar sensing device.

6. The input system of claim 1, wherein the planar sensing device is a temperature detection device for determining the motion of the at least one object according to the variation of the temperature caused by the at least one object when the at least one object touches the planar sensing device.

7. The input system of claim 1, wherein the planar sensing device is a pressure detection device for determining the motion of the at least one object according to the variation of the pressure caused by the at least one object when the at least one object touches the planar sensing device.

8. The input system of claim 1, wherein the planar sensing device is an infrared ray detection device for determining the motion of the at least one object according to the variation of the light path caused by the at least one object when the at least one object touches the planar sensing device.

9. The input system of claim 1, wherein the planar sensing device is an image capture device for determining the motion of the at least one object according to the variation of the image caused by the at least one object when the at least one object touches the planar sensing device.

* * * * *